(12) United States Patent
Barker et al.

(10) Patent No.: US 10,651,568 B2
(45) Date of Patent: May 12, 2020

(54) BASE STATION ANTENNA SYSTEM WITH ENHANCED ARRAY SPACING

(71) Applicant: Quintel Technology Limited, Bristol (GB)

(72) Inventors: David Edwin Barker, Stockport (GB); Peter Chun Teck Song, San Francisco, CA (US)

(73) Assignee: Quintel Cayman Limited, George Town, Grand Cayman (KY)

( * ) Notice: Subject to any disclaimer, the term of this patent is extended or adjusted under 35 U.S.C. 154(b) by 208 days.

(21) Appl. No.: 15/632,443

(22) Filed: Jun. 26, 2017

(65) Prior Publication Data

US 2018/0026379 A1 Jan. 25, 2018

Related U.S. Application Data

(60) Provisional application No. 62/364,173, filed on Jul. 19, 2016.

(51) Int. Cl.
*H01Q 1/24* (2006.01)
*H01Q 21/06* (2006.01)
(Continued)

(52) U.S. Cl.
CPC ........... *H01Q 21/065* (2013.01); *H01Q 1/246* (2013.01); *H01Q 5/42* (2015.01); *H01Q 9/0421* (2013.01);
(Continued)

(58) Field of Classification Search
CPC ...... H01Q 21/065; H01Q 21/08; H01Q 21/24; H01Q 21/26; H01Q 21/28; H01Q 1/246;
(Continued)

(56) References Cited

U.S. PATENT DOCUMENTS 6,323,823 B1    11/2001  Wong et al.
2002/0105928 A1*  8/2002  Kapoor ................ H01Q 1/246
                                                            370/334
(Continued)

OTHER PUBLICATIONS

International Search Report and Written Opinion for corresponding International Patent Application No. PCT/US17/42637 dated Nov. 17, 2017. 13 Pages.

(Continued)

*Primary Examiner* — Hoang V Nguyen
*Assistant Examiner* — Awat M Salih
(74) *Attorney, Agent, or Firm* — Tong, Rea, Bentley, Kim, LLC

(57) ABSTRACT

In one example, a base station system comprises a base station radio unit for at least a first operating frequency and a plurality of linear antenna arrays. Each linear antenna array may comprise a plurality of radiating antenna elements, and the plurality of linear antenna arrays may be disposed in a horizontal plane. In one example, at least one set of linear antenna arrays of the plurality of linear antenna arrays for a first operating frequency has an array separation distance of substantially 1.6+1.1n wavelengths apart for the first operating frequency, where n is an integer greater than or equal to zero. In addition, in one example, the plurality of linear antenna arrays includes at least one linear antenna array for a second operating frequency that is different from the first operating frequency.

18 Claims, 12 Drawing Sheets

(51) Int. Cl.
  *H01Q 5/42* (2015.01)
  *H01Q 21/28* (2006.01)
  *H01Q 21/26* (2006.01)
  *H04B 7/0456* (2017.01)
  *H01Q 9/04* (2006.01)
  *H01Q 21/08* (2006.01)
  *H01Q 21/24* (2006.01)
  *H04B 7/10* (2017.01)
  *H04W 16/28* (2009.01)

(52) U.S. Cl.
  CPC ........... *H01Q 9/0435* (2013.01); *H01Q 21/08* (2013.01); *H01Q 21/24* (2013.01); *H01Q 21/26* (2013.01); *H01Q 21/28* (2013.01); *H04B 7/0456* (2013.01); *H04B 7/10* (2013.01); *H04W 16/28* (2013.01)

(58) Field of Classification Search
  CPC ...... H01Q 9/0421; H01Q 9/0435; H01Q 5/42; H04B 7/10; H04B 7/0456; H04W 16/28
  See application file for complete search history.

(56) References Cited

U.S. PATENT DOCUMENTS

| | | |
|---|---|---|
| 2009/0066595 A1* | 3/2009 | Barker .................. H01Q 1/246 343/757 |
| 2010/0046421 A1 | 2/2010 | Adams |
| 2013/0278463 A1 | 10/2013 | Nilsson et al. |
| 2015/0195001 A1 | 7/2015 | Barker et al. |
| 2015/0222025 A1 | 8/2015 | Song et al. |
| 2016/0181693 A1 | 6/2016 | Kapoor et al. |

OTHER PUBLICATIONS

European Search Report dated Jan. 22, 2020 in corresponding EP Application No. 17831705.3, 8 pages.

* cited by examiner

500

BASE STATION ANTENNA SYSTEM WITH ENHANCED ARRAY SPACING

CROSS-REFERENCE TO RELATED APPLICATIONS

This application claims priority to U.S. Provisional Patent Application Ser. No. 62/364,173, filed Jul. 19, 2016, which is herein incorporated by reference in its entirety.

FIELD OF THE DISCLOSURE

The present disclosure relates generally to base station antenna systems, and more particularly to solutions to minimize inter-sector interference.

BACKGROUND

Cellular base station antennas may comprise multiple independent antenna arrays serving different bands, and/or comprise multiple arrays which serve the same band designed to exploit multiple input-multiple output (MIMO) features of radio access network (RAN) technologies, such as Long Term Evolution (LTE) and LTE-Advanced.

SUMMARY

In one example, a base station system comprises a base station radio unit for at least a first operating frequency and a plurality of linear antenna arrays. Each linear antenna array may comprise a plurality of radiating antenna elements, and the plurality of linear antenna arrays may be disposed in a horizontal plane. In one example, at least one set of linear antenna arrays of the plurality of linear antenna arrays for a first operating frequency has an array separation distance of substantially 1.6+1.1n wavelengths apart for the first operating frequency, where n is an integer greater than or equal to zero. In addition, in one example, the plurality of linear antenna arrays includes at least one linear antenna array for a second operating frequency that is different from the first operating frequency.

In another example, the present disclosure provides a method of deploying or operating a base station system as described above.

In another example, a base station system includes at least three sectors, each sector providing a wireless communications service over a range of azimuth angles in a service area, and each sector comprising at least one base station radio unit for operation in a particular band of radio spectrum and for applying precoding weights for beamforming signals via an antenna system associated with each base station radio unit. In one example, each antenna system includes a plurality of linear antenna arrays, each linear antenna array comprising a plurality of radiating antenna elements, and the plurality of linear antenna arrays disposed adjacent to each other. In at least one of the antenna systems, at least one pair of linear antenna arrays of a same operating frequency associated with the at least base station radio unit has an array separation distance of greater than one wavelength for the operating frequency. In addition, in one example, the array separation distance minimizes radio frequency power radiated by grating lobes at angles which fall into service areas of sectors adjacent to a sector of the at least three sectors associated with the at least one of the antenna systems, the grating being caused by precoding weights when serving traffic within the sector associated with the at least one of the antenna systems.

In another example, the present disclosure provides a method of deploying or operating a base station system as described above.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
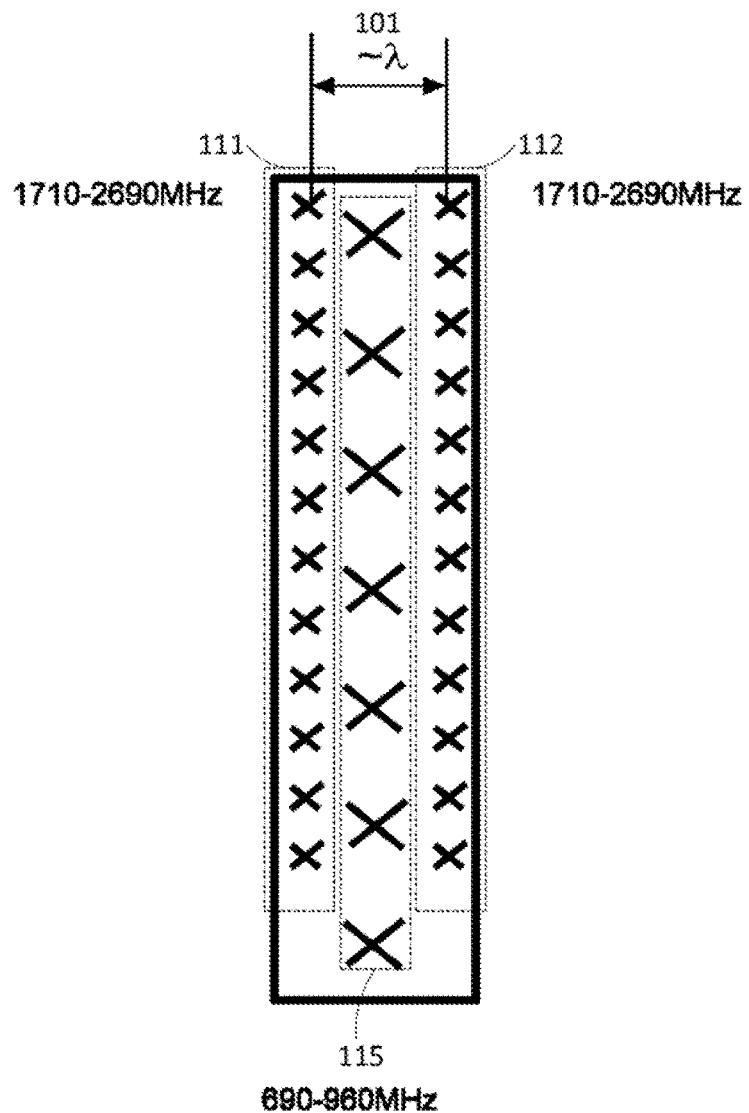
FIG. 1 depicts an example antenna array topology.

Examples of the present disclosure minimize inter-sector co-channel interference caused by the result of beamforming of user traffic via precoding across a plurality of correlated antenna arrays in a serving base station sector. Interference is minimized by using a number of particular array separation distances which specifically minimize RF power radiated by grating lobes at angles which fall into adjacent sector service areas; the grating being caused by the precoding weights when serving traffic within the serving sector. The plurality of arrays can be arrays contained in the same physical antenna assembly or can be arrays contained in different antenna assemblies, or a combination thereof.

Most sectored base station sites which have two or more antenna assembly positions per sector sharing a headframe tend to employ some fixed or arbitrary antenna assembly separation distance rules. Examples of the present disclosure use particular array separation distances which minimize inter-sector interference, coupled with the fact that the plurality of arrays may be available in different multi-array antenna assemblies and hence offering an opportunity to re-design how existing and/or new multi-array antenna assemblies are positioned and separated relative to each other on a base station sector headframe. The present disclosure extends to supporting multiple spectrum bands simultaneously through a joint optimization approach. In short, the present disclosure can deliver higher-order multiple input/multiple output (MIMO) features more optimally providing higher spectral efficiency across a combination of spectrum bands via simple repositioning of multi-array antenna assemblies.

Cellular base station antennas may comprise multiple independent antenna arrays serving different bands, and/or comprise multiple arrays which serve the same band designed to exploit MIMO features of radio access network (RAN) technologies, such as Long Term Evolution (LTE) and LTE-Advanced. A popular base station antenna configuration comprises four arrays, composed as two identical arrays of dual-polarized cross-polar antenna elements serving the same spectrum band(s) which are disposed in a linear side-by-side configuration, the array topology being placed about λ/4 in front of a shared finite reflecting aperture in order to enhance directivity in a given boresight direction. Sometimes this array topology is referred to as CLA-2X (closely spaced linear arrays, two cross-polar arrays). The two dual-polarized arrays can be spaced apart by any distance, but an optimal spacing is around λ/2. Such an antenna configuration is designed for use with base station radio units which can provide MIMO features leveraging four antennas. In one example, a base station radio unit has four radio frequency (RF) ports which connect to the four antenna arrays, where each RF port serves duplexed RF transmit and RF receive signals, and often termed as a 4T4R radio. The duplexing scheme can be either frequency division duplex (FDD) or time division (TD). In one example, the antenna configuration may also share a radome and be considered as a single (multi-array) antenna assembly, and hence provides an advantage over deploying multiple separate dual-polarized antenna arrays in terms of total costs, site zoning, antenna rentals, and wind-loading.

When two dual-polarized antenna arrays (as CLA-2X) are deployed in a typical macrocell radio channel, the arrays offer two correlated pairs of uncorrelated ports (or equally two uncorrelated pairs of correlated ports). LTE MIMO schemes then, in effect, can exploit some directive beamforming (using the correlated arrays) with two-layer spatial multiplexing (using the uncorrelated arrays). Alternative antenna array topologies such as having four closely spaced co-polarized arrays (giving four correlated arrays) may provide further beamforming gains but less spatial multiplexing. Another alternative array topology includes having two widely spaced dual-polarized arrays (sometimes referred to as diversity—2 cross polarized antennas or DIV-2X) giving four uncorrelated arrays thus providing no directive beamforming but up to four-layer spatial multiplexing. However, most user equipment (UE) terminals only support two antennas, and hence four-layer spatial multiplexing is generally not possible with single user MIMO schemes (SU-MIMO).

LTE FDD schemes use codebook based pre-coding of user data. When LTE FDD pre-coding is used with correlated arrays such as with CLA-2X antennas, this pre-coding can be considered as codebook based beamforming by virtue of the fact the pre-coding creates a directive beam for user data. With FDD, the UE measures downlink reference symbols transmitted from each base station antenna, performs a channel estimation and reports back via the uplink channel, a pre-coding matrix indicator (PMI), which the base station can use to optimally pre-code the user data for the next downlink transmission interval. In one example, the codebook is finite and is known both at the base station and UE; this means the uplink signalling can be significantly reduced over the case where the UE feeds back full channel state information to the base station. The finite codebook however means that a finite number of directive beams would be formed when using a CLA-2X antenna.

With LTE time division duplex (TDD) or TD-LTE schemes, non-codebook based pre-coding is possible since radio channel reciprocity can be exploited. In TD-LTE, channel estimation made on the uplink can be used to pre-code user data on the downlink channel. This permits arbitrary pre-coding weights to be used, sometimes referred to as Eigenvector based beamforming. The range of possible beams is limited only by the resolution of the pre-coding weights. Consider an example where a UE transmits data on the uplink. The base station receiver may combine the signal received on four antenna arrays using four branch maximal ratio combining (MRC) at baseband. In the trivial line of sight (LoS) case, an uplink signal arriving at the antenna array at an azimuth angle away from antenna boresight means that the signal is received at the correlated arrays with a fixed phase difference; this is a simple direction of arrival (DoA) estimation. The complex vector weights (amplitude and phase) estimated in the MRC can be used for pre-coding the downlink data intended for that UE; in the simple LoS case, this means the user data is directed toward the UE as a steered beam at the same angle as the DoA determined on the uplink.

Most macro base station sites comprise three sectors each serving approximately 120 degrees of azimuth. This tri-sector arrangement provides a contiguous mobile radio service area with a minimum number of sites. This is related to the fact three sector service footprint tessellates with neighbouring base station sites more efficiently than other quantities of sectors per site. If a base station using the CLA-2X antenna is deployed in each sector, codebook (in the case of LTE FDD) or non-codebook (in the case of TD-LTE) based beamforming will serve UE's across the service area. UE's will be served by their respective base station cell. The spectral efficiency and resulting data throughput performance on the downlink, to each served UE will be a function of the radio channel rank and signal to interference+noise ratio (SINR). Additionally, any performance metric is normally measured under full network load, often termed "full buffer" to indicate that the user data channels at each cell are always fully loaded. The radio channel rank is a measure of how many spatial channels are available for MIMO spatial multiplexing; in the case of CLA-2X antenna this is normally a maximum of two since only two uncorrelated branches are available at the CLA-2X antenna. Wider separation between the two dual-polarized arrays means correlation between co-polar ports reduces. When sufficiently de-correlated, e.g. beyond 10λ distance for a macro base station site, the antenna scheme is longer be referred to as CLA-2X and becomes DIV-2X, where it is intended to create four de-correlated branches, meaning channel rank of up to four is more common.

The current disclosure concerns CLA-2X antenna arrays where correlation between co-polar ports can be considered high, and in several embodiments where the two dual-polarized arrays can be packaged in one physical radome. The SINR is a direct function of the wanted signal which is carried by a beam-formed radiation pattern, relative to the co-channel interference at the UE location. The co-channel interference is the sum of the power of co-channel resources arriving at the UE location from other sectors of the same site (inter-sector interference) and from all other sectors from other base station sites (inter-site interference). Optimized antenna tilting for example ensures coverage is met while minimizing inter-site interference.

The inter-sector interference is a result of how much the beam-formed azimuthal radiation patterns (from a CLA-2X antenna system) which are serving UE's in the adjacent sectors spill-over into the serving sector where the wanted UE is. This spill-over is due to grating lobes created by the beam-forming action. The magnitude of the grating lobes and direction in azimuth of the grating lobes are a function of the spacing between the dual-polarized arrays. When the two dual-polarized arrays in CLA-2X are separated by around 0.5λ, this is considered as providing optimal beam-forming since a minimal level of grating lobes are generated when serving a uniform spatial UE traffic distribution, when compared to larger separation distances. Array separation distances less than 0.5λ are not considered as mutual coupling between the arrays tend to make the antenna system inefficient in terms of radiating power. Separation distances up to 0.7λ are also considered adequate since any grating lobes are small, over the beamforming range of azimuth angles (sometimes called scan range). It is normal that the array serves a range of frequencies, where the array separation is around 0.5λ for the lowest frequency served. For example, a CLA-2X antenna covering the frequency range 1700-2360 MHz might have a separation of 88 mm which is 0.5λ for 1700 MHz, and means this is 0.7λ for 2360 MHz.

Many base station antennas support multiple spectrum bands. For instance, a popular multi-band antenna assembly includes a linear array of dual-polarized antenna elements supporting a low-band of frequencies such as 690 to 960 MHz, and two dual-polarized linear arrays disposed either side of the low-band array, supporting high-band of frequencies such as 1710 to 2690 MHz. This particular array topology presents a symmetrical design longitudinally along the linear length of the multi-band antenna where the low-band array is centrally positioned in front of the reflecting aperture, helping to ensure that the low-band radiation patterns are symmetrical, have minimal pattern squint away from boresight, and have good radiation pattern tracking between the polarized arrays over a range of azimuth angles. Such an antenna has six physical linearly-polarized arrays and hence six RF ports for connections to a base station radio unit(s); two ports for low-band and four ports for high-band. The presence of the low-band dual-polarized array means that the two high-band dual-polarized arrays (as a CLA-2X arrangement) have to be physically spaced much further apart than the preferred 0.5λ on the shared finite common reflecting aperture. This antenna array topology 100 is illustrated in FIG. 1. In the example of FIG. 1, the high-band arrays 111, 112 may be separated by around 140 mm, which represents 0.8λ at 1700 MHz and 1.25λ at 2690 MHz. (The separation λ is indicated by label 101 in FIG. 1). When these high-band arrays 111, 112 are used with 4T4R LTE radios as a CLA-2X antenna configuration with such an array separation, grating lobes will be produced as a result of the beam-forming action serving UE's. If these grating lobes are significant at angles which fall into adjacent sectors of the sectored base station site, then this will create an increase in inter-sector interference. Further illustrated in FIG. 1 is a low-band array 115 (e.g., operating at 690-960 MHz).

Inter-sector interference can be computed through network simulations. It can be shown for a homogeneous distribution of UE's across a three-sectored base station site or a cluster of regularly tessellated three-sectored base station sites, where each sector serves an azimuth range of 120 degrees and having a CLA-2X antenna with an array separation of about 1.1λ, creates a worst case scenario with a maximum of inter-sector interference due to the creation of grating lobes.

Figure 2B:
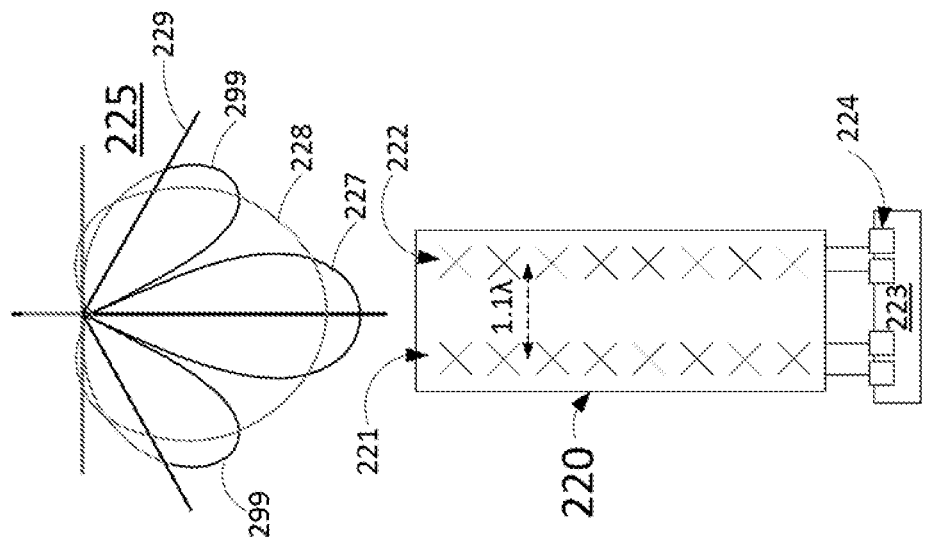
FIGS. 2A and 2B depict two example antenna systems.
Figure 2A:
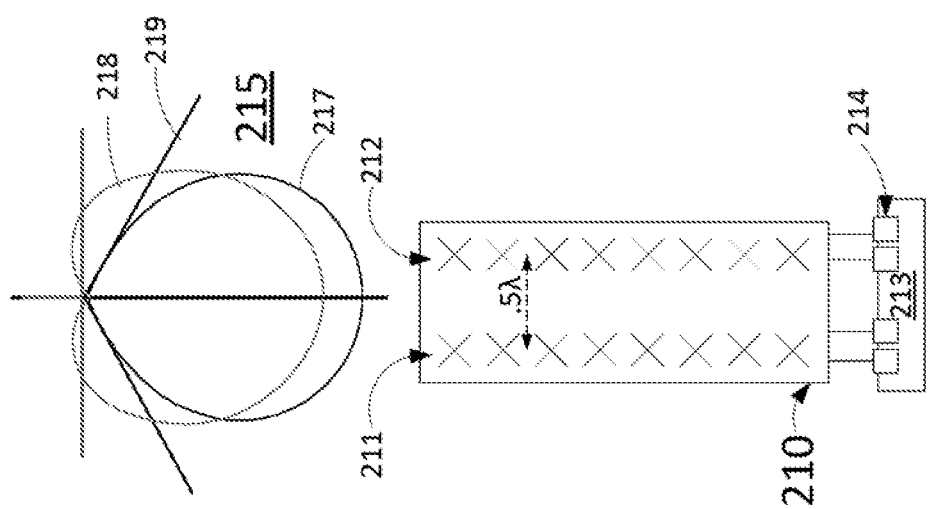

To help illustrate this, FIGS. 2A and 2B depicts two different CLA-2X antenna systems (210, 220 respectively) where the separation between dual-polarized arrays are 0.5λ and 1.1λ. In the antenna system 210 of FIG. 2A each CLA-2X antennas 211, 212 is connected to a TD-LTE base station radio unit 213 (e.g., a base station radio and associated baseband equipment) with four duplexed transmit/receive (Tx/Rx) ports (4T4R) 214 operating in 3rd Generation Partnership Project (3GPP) Band 41 (2500 MHz). FIG. 2B depicts a similar arrangement with CLA-2X antennas 221, 222 and base station radio unit 223 with 4T4R ports 224 also operating in the 2500 MHz band. It should be understood that each of the antenna systems 210, 220 may also include a low-band array and corresponding base station connections for low-band transmit/receive ports which are omitted from FIGS. 2A and 2B for ease of illustration. In one example, Transmission Mode 8 (TM8) is used to pre-code user data, also referred to as "dual layer beamforming" which offers up to two spatially multiplexed data layers with beamforming across co-polar (correlated) antenna arrays for each layer. FIG. 2A also depicts a graph 215 with the resulting downlink user data radiation pattern in azimuth 217 of either layer, when serving a UE at boresight; the UE being at a bearing of 180 degrees in FIG. 2A (and similarly in FIG. 2B). For reference, the radiation pattern 218 indicates the azimuthal radiation pattern for any one of the individual arrays in isolation, and the lines 219 denote boresight and the +/−60 degree serving sector edges (similar references are illustrated in FIG. 2B, i.e., radiation pattern 228 and lines 229, respectively).

It can be clearly seen for the optimal array separation of 0.5λ, a directive beam is formed toward the UE (pattern 217), which will have around 3 dB additional gain over using an individual dual-polarized array. Furthermore, there are no sidelobes or grating lobes which spill-over into neighbouring sectors, i.e. beyond the +/−60 degree serving sector edges for a tri-sectored base station site. Similarly, for the 1.1λ array separation case of FIG. 2B, the graph 225 indicates a directive beam 227 is formed toward the UE with approximately 3 dB gain over the individual array. Both CLA-2X antenna configurations will benefit from a 3 dB increase in power received at the UE on the downlink, due to the beamforming gain available from a doubling of the array aperture. However, for the 1.1λ case, it is seen that the grating lobes 299 formed may spill-over into the adjacent sector (e.g., beyond the +/−60 degree sector edges denoted by lines 229) causing some increase in inter-sector interference.

FIGS. 2A and 2B essentially illustrate the beamforming for an instant in time, when serving a UE at boresight. However, it may be useful to calculate the inter-sector interference resulting from the beam-forming process when serving multiple UE's at different locations, across all three sectors, and over a meaningful period of time, in order to better determine the impact of inter-sector interference. The results of such a simulation with a fully loaded network and a homogeneous distribution of UE's is shown in the graph 300 of FIG. 3. The graph 300 shows the average increase in downlink inter-sector interference across a three sectored base station site for different CLA-2X array separation distances, for a TD-LTE service using TM8 (or dual layer beamforming). It should be noted that in connection with the example of FIG. 3, there is no coordinated scheduling between base station sectors. The increase in inter-sector interference is relative to the non-beamforming case when using a dual-polarized antenna with a non-beamforming 65 degree 3 dB beamwidth azimuth radiation pattern, or simply just one of the two dual-polarized arrays, for example. All CLA-2X configurations will enjoy a 3 dB increase in directivity, and hence gain. The inter-sector interference can vary by up to 6 dB depending upon the array separation distance, with a worst case inter-sector interference scenario when array separation is around 1.1λ (see peak labelled 310).

Figure 3:
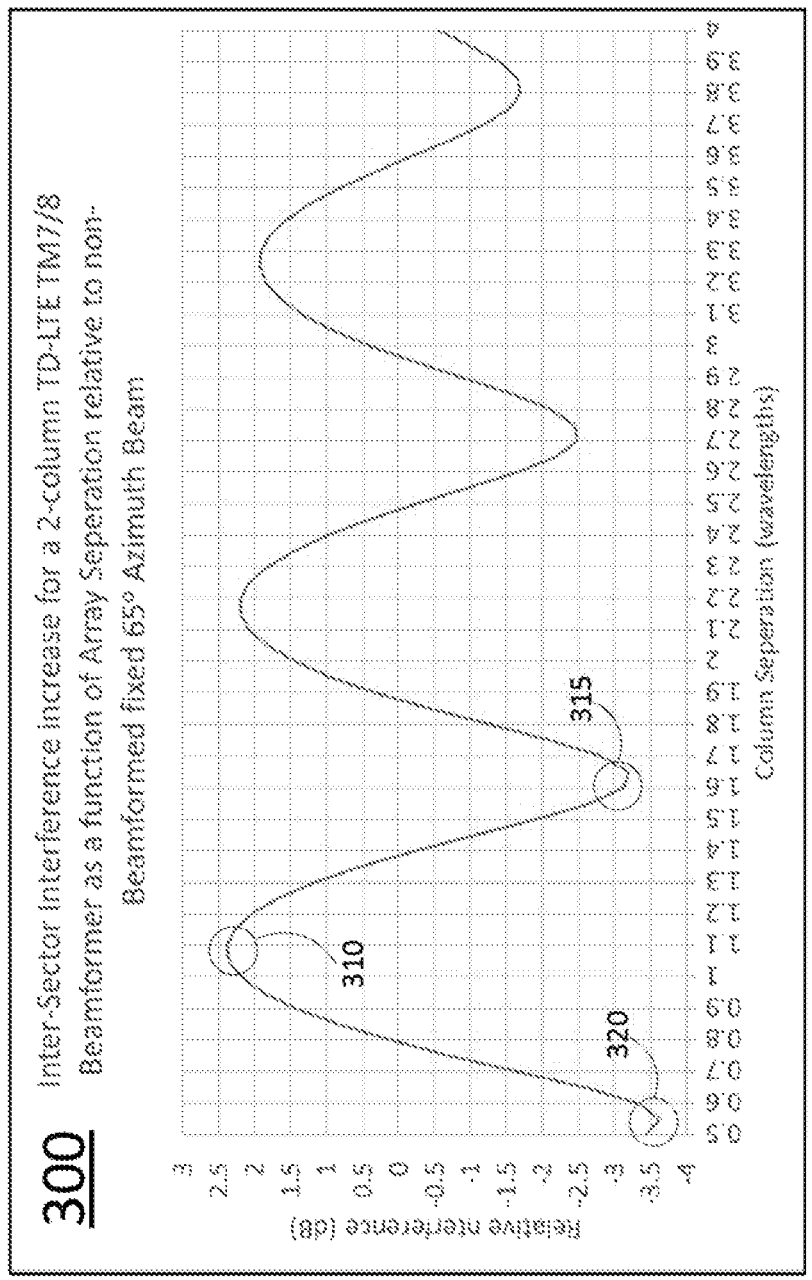
FIG. 3 is an example graph illustrating inter-sector interference for different array separation distances.

The results shown in FIG. 3 are commensurate with the examples of FIGS. 2A and 2B. For example, FIG. 2B reveals that an array separation of around 1.1λ results in significant grating lobes and hence inter-sector interference, which may be coupled with the fact that for a homogeneous distribution of UEs around a three sectored base station site means that a highest proportion of UE's will be around boresight and a decreasing proportion of UE's will be served toward the sector edges. To a first order, the beamformed radiation patterns in FIG. 2A (or 2B) will be most common. As can be seen in FIG. 3, increasing the linear array separation to 1.6λ (see label 315) offers an advantageous (minimum) inter-sector interference scenario; this separation is not quite as good as when the array separation is 0.5λ (see label 320), but it is the next best choice of array separation if 0.5λ is not possible.

Figure 4:
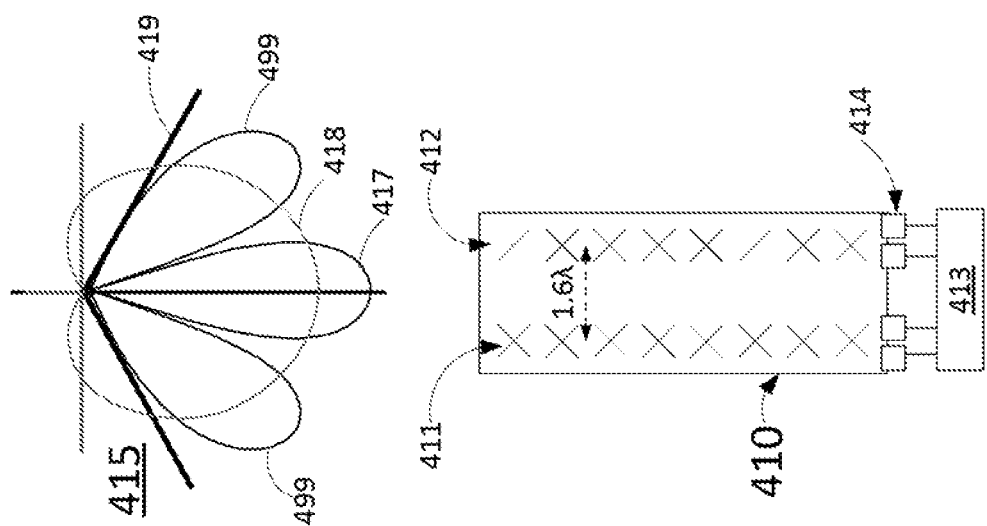
FIG. 4 illustrates a first example antenna system of the present disclosure.

FIG. 4 illustrates an example antenna system 410 (e.g., a CLA-2X antenna system with a base station radio unit 413 (e.g., a base station radio and associated baseband equipment), 4T4R ports 414, and antenna arrays 411 and 412), where a 1.6λ separation between antenna arrays 411, 412, generates a beamformed radiation pattern in azimuth (e.g., when serving a UE at boresight) where the grating lobes 499 do not fall beyond the sector edges (denoted by lines 419). The graph 415 illustrates that the directive beam 417 created when using an array separation of 1.6λ is narrower than for the 0.5λ case (See FIG. 2A), but still offers a 3 dB gain and is of sufficient beamwidth to ensure that the UE is efficiently served, considering azimuth dispersion for most macrocellular radio channels. (Also shown in the graph 415 is a reference radiation pattern 418, similar to 218 and 228 in FIGS. 2A and 2B, respectively).

While FIG. 3 summarizes the results of a TD-LTE network simulation, similar results and observations can be made with FDD networks. With FDD, a limited number of pre-coding weights which create beamformed patterns are used since the codebook is finite; the FDD case in fact creates one of four different beamformed radiation patterns to serve each UE, rather than precise beamformed directive patterns in the case of TD-LTE using TM8.

FIG. 3 also indicates that increasing the separation distance between the two dual-polarized linear arrays reveals a cyclic yet diminishing variation in the level of inter-sector interference, with optimal distances occurring approximately every 1.1λ separation from the most optimal 0.5λ array separation case. At larger separation distances such as beyond 4λ, (not shown), the beamformed patterns produce more grating lobes and the pattern becomes increasingly interferometric. When very narrow grating lobes are generated from a wide array separation, especially for TD-LTE, there is a risk that the directive beam is not precisely directed toward the UE due to mismatches in phase characteristics between downlink and uplink radio components, for example such as power amplifiers and low noise amplifiers, respectively. For TD-LTE antennas, it is common to include a calibration port on the antenna where periodic phase measurements are made to each array and used as part of a feedback system to help compensate for any change in phase, but the calibration accuracy or resolution will be finite. Directive beams formed for array separation distances up to say 4λ will be reasonably robust and largely unaffected by calibration limitations.

Figure 5:
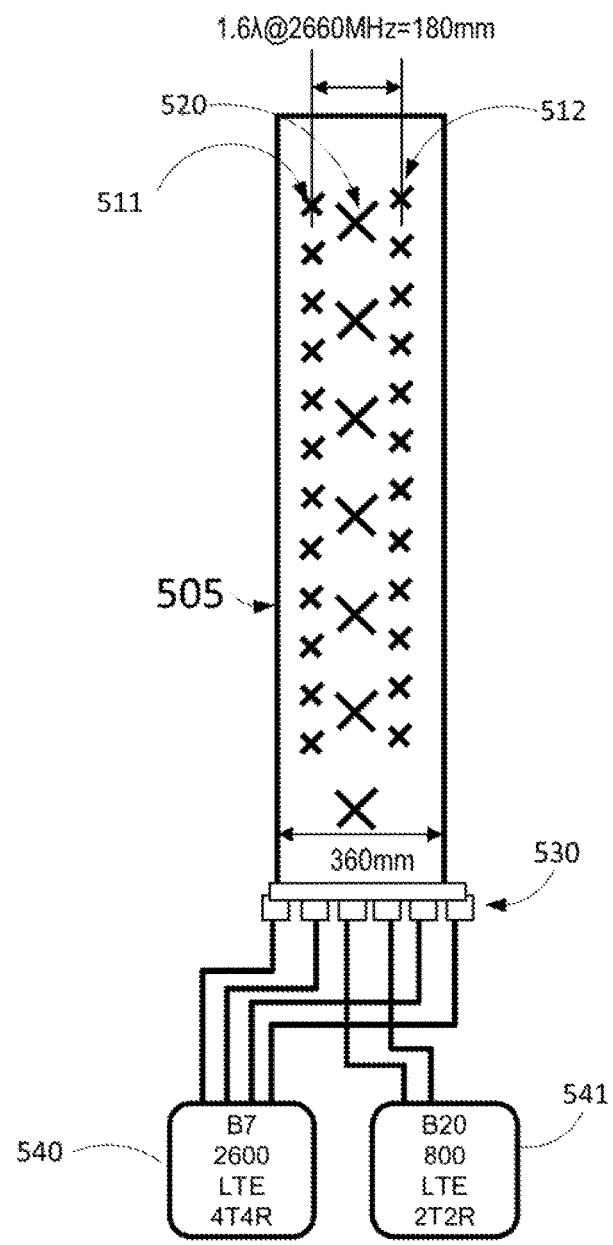
FIG. 5 illustrates a second example antenna system.

FIG. 5 illustrates an example antenna system 500 comprising a six-port multi-band antenna 505. The antenna 505 includes high-band arrays 511, 512, which in one example are separated by 180 mm corresponding to 1.6λ at the centre of the downlink portion of the 3GPP Band 7 (2600 MHz), used in Europe and many other regions of the world. The two high band arrays 511, 512 are connected to LTE base station radio unit 540 (e.g., a 4T4R base station radio and baseband equipment) via four of the ports 530. For completeness, the low-band array 520 is illustrated connected via two of the ports 530 to LTE base station radio unit 541 (e.g., a 2T2R base station radio and associate baseband unit), operating for example in 3GPP Band 20 (800 MHz in Europe).

An array separation of 180 mm may correspond to an overall width for antenna 505 of approximately 360 mm (approximately double). This width may be acceptable for most operators when considering deployment of panel type antennas at macro base station sites in terms of zoning, rentals, wind load and aesthetics in general. The two high-band arrays 511, 512 are generally wideband, for example, covering a range from 1710-2690 MHz. Therefore, if an LTE service using beamforming in the 1800 MHz (3GPP Band 3) were to be deployed onto the high-band ports, the array separation of 180 mm would be equivalent to 1.1λ, and hence a sub-optimal choice of separation with respect to inter-sector interference. An array separation of 230 mm may offer a balanced compromise where the downlink portions of the 1800 MHz and 2600 MHz bands correspond to 1.4λ and 2.0λ, respectively but implies a wider antenna assembly, e.g., over 400 mm, and which may be unacceptable in terms of zoning or wind loading.

Figure 6:
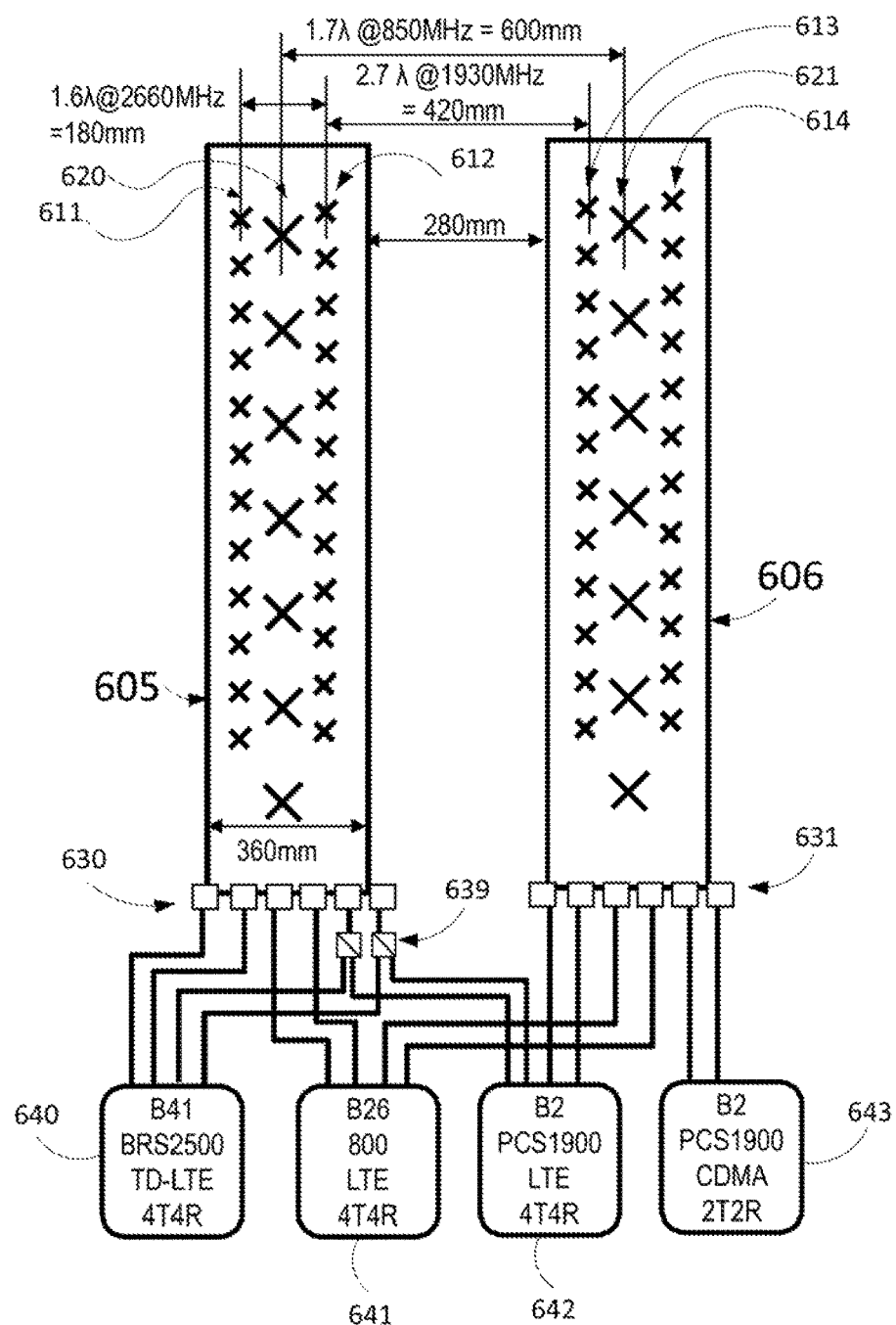
FIG. 6 illustrates a third example antenna system of the present disclosure.

FIG. 6 depicts an example antenna system 600 of the present disclosure. Two multi-band antennas 605, 606 (which may be the same as or similar to the antenna 505 of FIG. 5), are disposed in a horizontal plane. Each of the multi-band antennas 605, 606 incudes six ports, 630 and 631, respectively. In one example, the center-to-center separation is about 600 mm apart. The two dual-polarized low-band arrays 620, 621, one from each multi-band antenna 605, 606, are separated by this 600 mm since the low-band arrays 620, 621 are centrally positioned on the multi-band antenna. 600 mm corresponds to about 1.7λ at the centre of the downlink portion of 3GPP Band 26 (used in USA). When a four-port LTE base station radio unit (e.g., base station radio unit 641) is connected to these low-band arrays 620, 621 and is capable of codebook based pre-coder beamforming, this separation provides a minimal and/or reduced level of inter-sector interference, e.g., as compared to other array separation distances.

FIG. 6 also shows a TD-LTE base station radio unit 640 operating in 3GPP Band 41 (2500 MHz) connected to four of the ports 630 for the two dual-polarized arrays 611, 612 of the left multi-band antenna 605, which are separated by 180 mm. As described for the 3GPP Band 7 (2600 MHz) base station radio unit 540 in FIG. 5, the separation of the two arrays 611, 612 is an optimal 1.6λ providing a minimum and/or reduced inter-sector interference. A four-port FDD LTE base station radio unit 642 operating in 3GPP Band 2 (PCS 1900 MHz) and capable of codebook based pre-coder beamforming is connected to dual-polarized array 612 of the left multi-band antenna 605 via two of the ports 630 (and via diplexers 639 since the 2500 MHz Band 41 base station radio unit 640 shares array 612 as well), and one dual-polarized array 613 of the right multi-band antenna 606 via two of the ports 631. Based on the array topology and 600 mm spacing between centrelines of the two multi-band antennas 605, 606, the separation of the two dual-polarized arrays 613, 613 for 1900 MHz is 420 mm which is approximately 2.7λ separation for the downlink portion of the PCS 1900 MHz band, and which also provides a minimal and/or reduced level of inter-sector interference. The remaining ports 631 of the right multi-band antenna 606 (e.g., two high-band ports) can be used to support other services such as CDMA in the PCS 1900 MHz as shown in FIG. 6 (e.g., connected to two-port CDMA PCS 1900 MHz base station radio unit 643).

Figure 7:
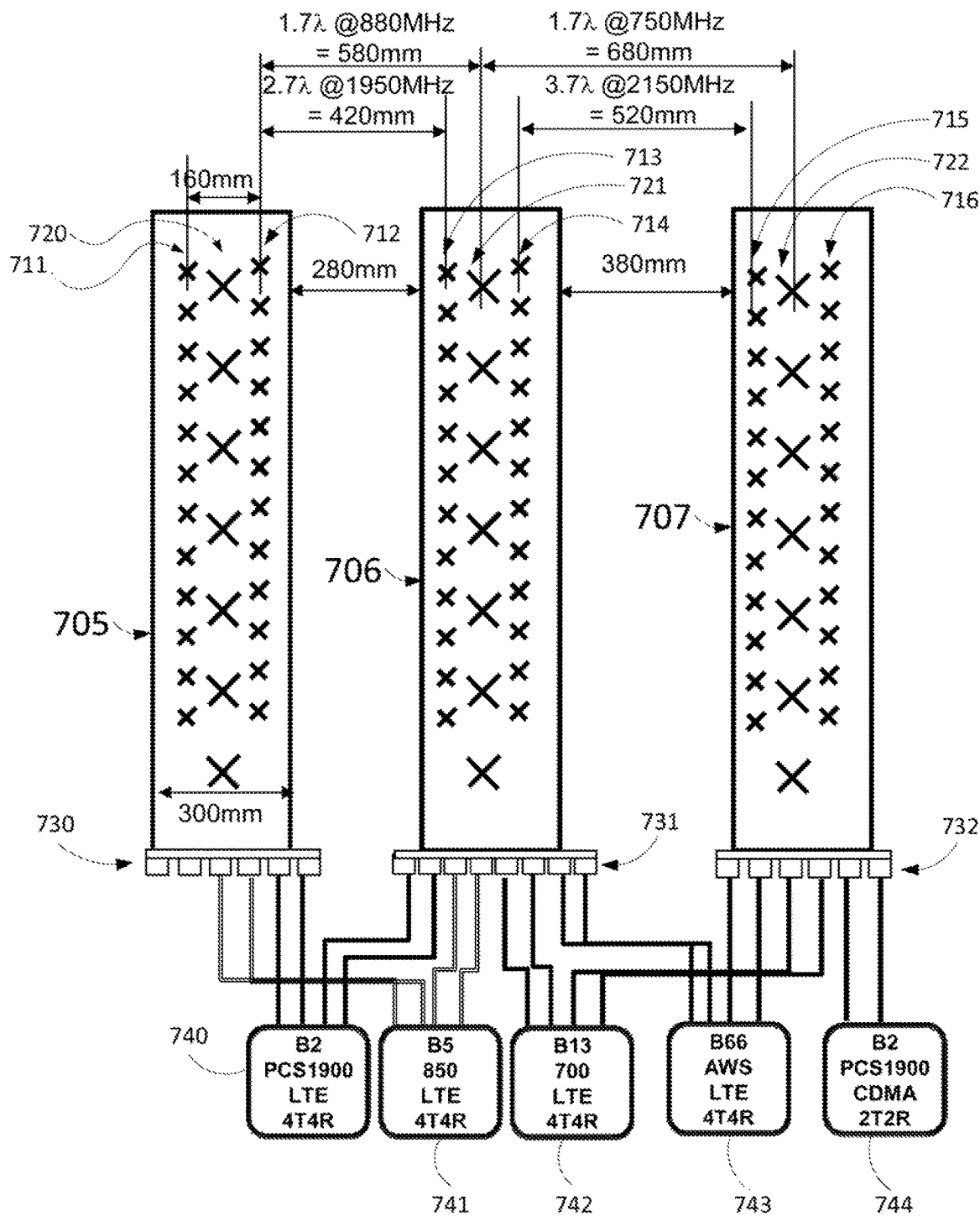
FIG. 7 illustrates a fourth example antenna system of the present disclosure.

FIG. 7 depicts another example antenna system 700 of the present disclosure. In the example of FIG. 7, near optimal array separations are engineered for supporting LTE services using three multi-band antennas 705, 706, 707. For instance, as illustrated in FIG. 7, each of the multi-band antennas 705, 706, 707 has a triple radiating array topology with a 300 mm width and a high-band dual-polarized array separation distance of 160 mm. The multi-band antennas 705, 706, 707 include high-band dual polarized arrays 711-716 respectively, and low-band dual polarized arrays 720, 721, and 722, respectively. The central multi-band antenna 706 is an eight-port antenna, where the central low-band array 721 supports both 700 MHz and 850 MHz spectrum bands. A four-port FDD LTE base station radio unit 741 operating in the 850 MHz (3GPP Band 5) and capable of codebook based pre-coder beamforming connects to two of the ports 730 of the left multi-band antenna 705 (e.g., low band ports for low band array 720), and to two of the ports 731 (e.g., low-band ports for low band array 721) of the central multi-band antenna 706. The left and central antennas (705, 706) are spaced apart by 580 mm which is also the array separation distance or around 1.7λ at the downlink frequencies for the 850 MHz LTE service. A similar arrangement is configured for the four-port LTE 700 MHz (3GPP Band 17) base station radio unit 742, capable of codebook based pre-coder beamforming, between central and right multi-band antennas (706, 707). A four-port FDD LTE base station radio unit 740 operating in the 1900 MHz (3GPP Band 2) capable of codebook based pre-coder beamforming connects to two of the ports 730 for the right high-band array 712 of the left multi-band antenna 705, and connects to two of the ports 731 for the left high-band array 713 of the central multi-band antenna 706. These two arrays 712, 713 are physically spaced apart by 420 mm which is around 2.7λ at the downlink frequencies for the 1900 MHz LTE Service. A similar arrangement is configured for the four-port LTE AWS (3GPP Band 66) base station radio unit 743, capable of codebook based pre-coder beamforming, between central and right multi-band antennas (706, 707) but giving a separation distance of around 3.8λ between the dual-polarized arrays 714 and 715. For instance, as illustrated in FIG. 7, base station radio unit 743 is connected to two of the ports 731 for the right high-band array 714 of the central multi-band antenna 706, and is connected to two of the ports 732 for the left high-band array 715 of the right multi-band antenna 707. Finally, any spare antenna ports can be used to support non-beamforming LTE services or legacy services. For instance, as illustrated in FIG. 7 two-port CDMA PCS 1900 MHz base station radio unit 744 is connected to two of the ports 732 for high band array 716 of the multi-band antenna 707. Similarly, another service (not shown) may be connected to two of the ports 730 of multi-band antenna 705, e.g., empty ports for high-band array 711. The specific spacing and configuration of connecting the dual-polarized arrays 711-716 and 720-722 arrives at a joint optimized solution where all four LTE services are able to minimize inter-sector interference by ensuring that array separation distances are equal to or close to optimal array separation distances of 1.6λ, 2.7λ, and 3.8λ.

Figure 8:
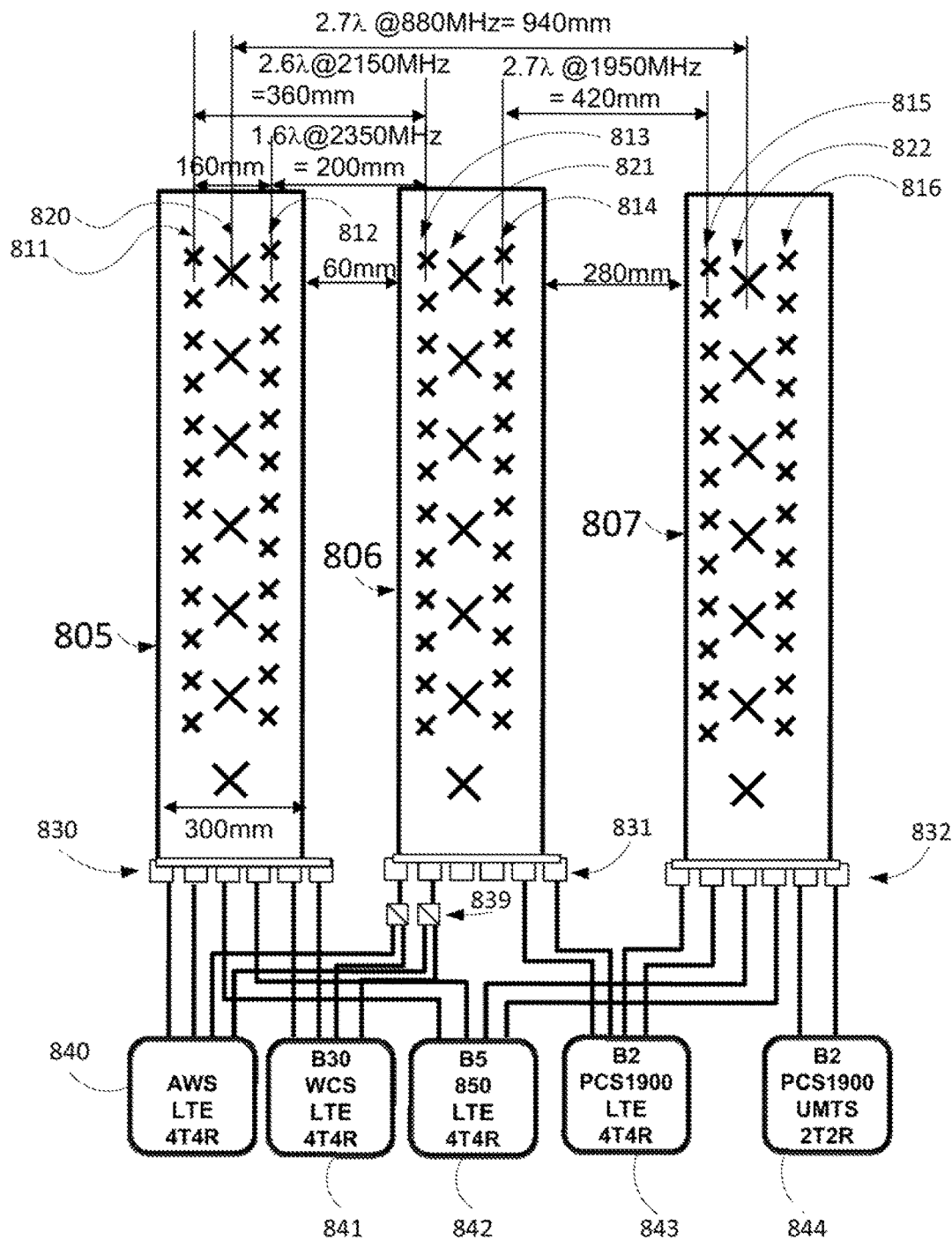
FIG. 8 illustrates a fifth example antenna system of the present disclosure.

FIG. 8 depicts an example antenna system 800 of the present disclosure. As illustrated in FIG. 8, near optimal array separations are engineered for supporting LTE services using three multi-band antennas 805, 806, 807. For instance, as illustrated in FIG. 8, each of the multi-band antennas 805, 806, 807 has a triple radiating array topology with a 300 mm width and a high-band dual-polarized array separation distance of 160 mm. The multi-band antennas 805, 806, 807 include high-band dual polarized arrays 811-816 respectively, and low-band dual polarized arrays 820, 821, and 822, respectively. A four-port FDD LTE base station radio unit 842 operating in the 850 MHz (3GPP Band 5) capable of codebook based pre-coder beamforming connects to two of the ports 830 (e.g., 850 MHz/low-band ports for low-band array 820) of the left multi-band antenna 805, and connects to two of the ports 831 (e.g., 850 MHz/low-band ports for low band array 822) of the right multi-band antenna 807. The left and right antennas 805, 807 are spaced apart (center-to-center) by 940 mm which is also the array separation distance or around 2.7λ at the downlink frequencies for the 850 MHz LTE service. A four-port FDD LTE base station radio unit 843 operating in the 1900 MHz (3GPP Band 2) capable of codebook based pre-coder beamforming connects to two of the ports 831 for the right high-band array 814 of the central multi-band antenna 806 and connects to two of the ports 832 for the left high-band array 815 of the right multi-band antenna 807. These two high-band arrays 814, 815 are physically spaced apart by 420 mm which is around 2.7λ at the downlink frequencies for the 1900 MHz LTE service. A similar arrangement is configured for the four-port LTE AWS (3GPP Band 66) base station radio unit 840 between the left and central multi-band antennas 805, 806 but giving a separation distance of around 2.6λ between the dual-polarized high-band arrays 811, 813. It should be noted that base station radio unit 840 is connected to two of the ports 831 for high-band array 813 via diplexers 839, since the high-band array 813 is shared with another service. In particular, a similar arrangement is configured for the four-port LTE WCS (3GPP Band 30) base station radio unit 841 between left and central multi-band antennas 805, 806 but giving a separation distance of around 1.6λ between dual-polarized arrays 812, 813. Finally, any spare antenna ports can be used to support non-beamforming LTE services or legacy services such as UMTS. For instance, as illustrated in FIG. 8 two-port UMTS PCS 1900 MHz base station radio unit 844 is connected to two of the ports 832 for high band array 816 of the multi-band antenna 807.

Again, as with the previous examples the specific spacing and configuration of connecting the dual-polarized arrays provides a solution where all beamforming LTE services are able to minimize inter-sector interference by ensuring that dual-polarized array separation distances are close to the optimal distances of 1.6λ, 2.7λ and 3.8λ. In view of these examples, it may be appreciated that a multitude of different configurations can exist using newly designed multi-band antennas, existing antennas, and a range of permissible separation distances between multi-band antennas.

Figure 9:
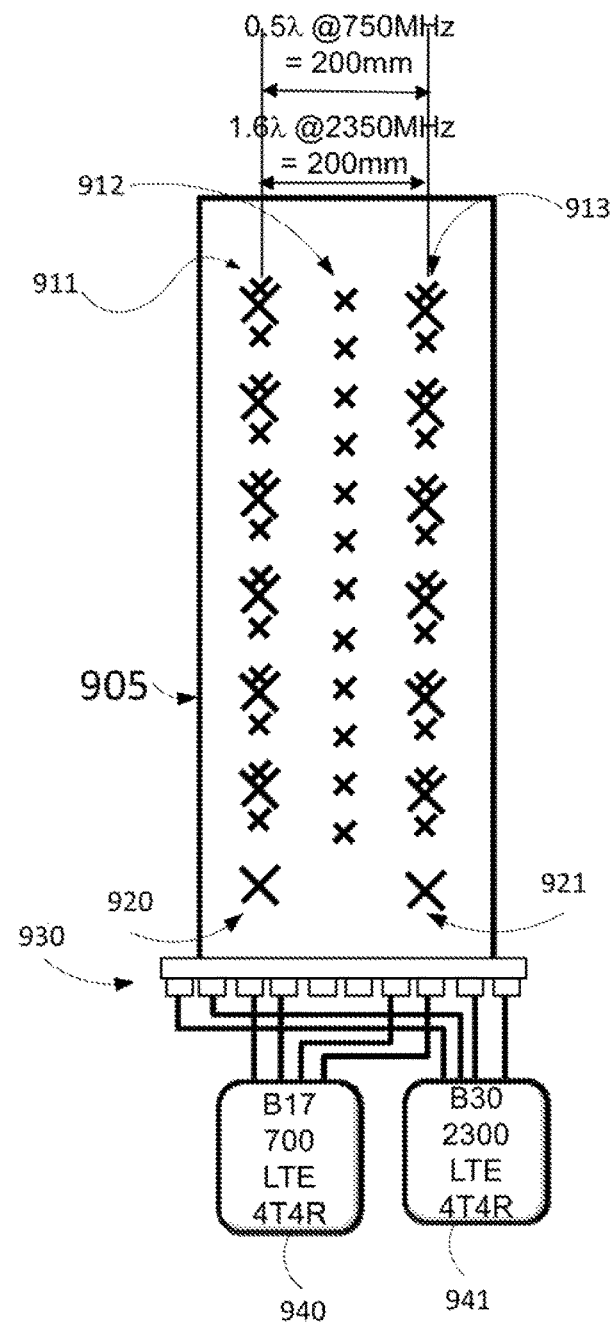
FIG. 9 illustrates a sixth example antenna system of the present disclosure.

FIG. 9 depicts an example antenna system 900 of the present disclosure. The example of FIG. 9 includes a single multi-band antenna 905 (or an "antenna assembly") comprising ten ports 930, two dual-polarized arrays 920, 921 for operation in a low-band of spectrum (e.g., 690-900 MHz), and three dual-polarized arrays 911-913 designed for operation in a high-band of spectrum (e.g., 1700-2400 MHz). The two low-band arrays 920, 921 are disposed at an optimal 0.5λ separation for codebook based pre-coder beamforming operation at 750 MHz (200 mm) and may support, for example, 3GPP Band 17, e.g., base station radio unit 940. Two of the high-band arrays 911, 913 are co-linear with the low-band arrays 920, 921 and hence also have the same array separation distance of 200 mm. These two high-band arrays 911, 913 are connected to a 3GPP Band 30 base station radio unit 941 operating in the 2300 MHz range, equating to 1.6λ separation, and hence minimizing and/or reducing inter-sector Interference. The overall width of the antenna may be around 450 mm or less for a 65 degree 3 dB azimuthal beamwidth for each array.

Examples of the present disclosure extend to supporting higher order beamforming, such as the case when four dual-polarized arrays are used. Such multi-array antennas are more commonly used with TD-LTE services and normally adhere to a strict 0.5λ array separation design. It is can be similarly shown through simulations that with such higher-order beamforming, sub-optimal array separation distances occur, e.g., around 1.1λ, where grating lobes beyond the sector edges of +/−60 degrees are stronger than for other array separation distances when serving a uniform distribution of user traffic. However, optimal beamforming array separation distances again occur at around 1.6λ for minimizing inter-sector interference.

Figure 10:
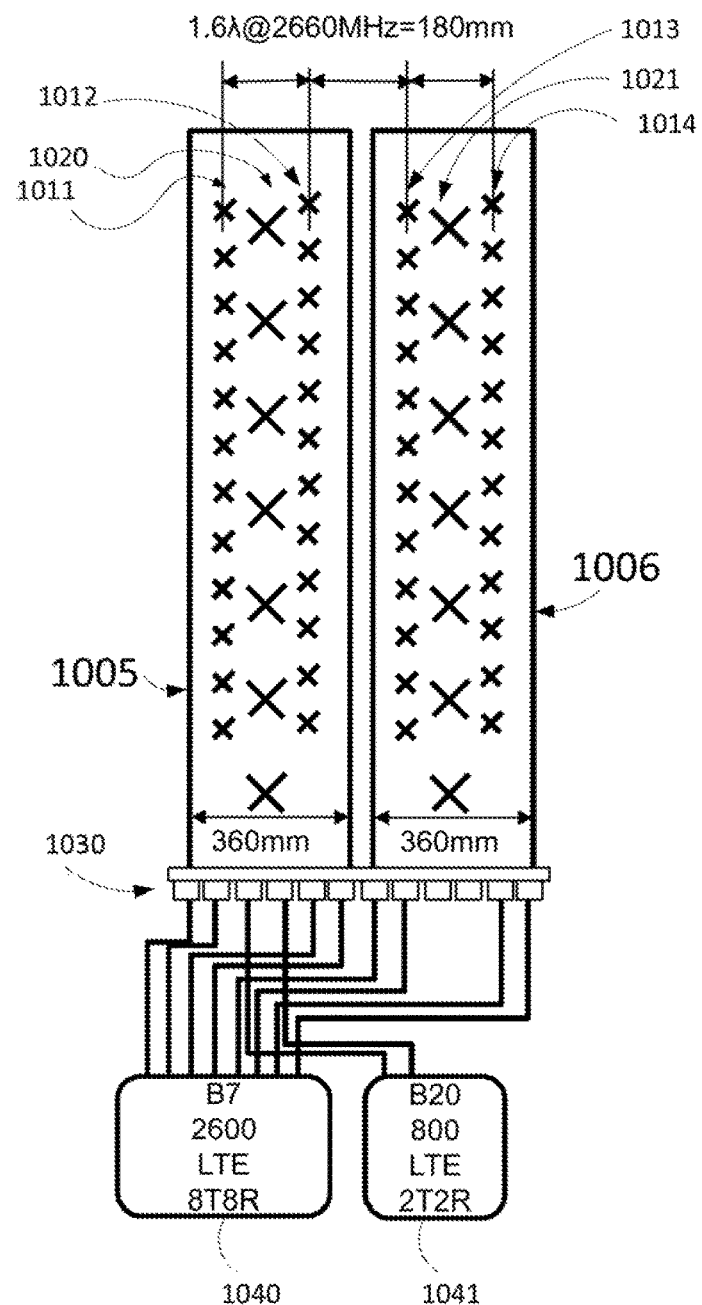
FIG. 10 illustrates a seventh example antenna system of the present disclosure.

A further example of the present disclosure proposes optimal array separation distances when a 0.5λ separation distance is not available for higher order beamforming using eight branches. For example, FIG. 10 illustrates an antenna system 1000 with two multi-array antennas 1005, 1006 (which may the same as or similar to multi-array antennas 605, 606 of FIG. 6), each having one dual-polarized array 1020, 1021 serving a low-band range of spectrum and two dual-polarized arrays 1011, 1012 and 1013, 1014, respectively, serving a high-band range of spectrum. The two multi-array antennas 1005, 1006 are each six-port antennas, and collectively provide twelve ports 1030. The high-band dual-polarized arrays 1011-1014 are connected to a LTE 3GPP Band 7 (2600 MHz) base station radio unit 1040 with eight RF ports connected to eight of the ports 1030, where base station radio unit 1040 is designed to operate with codebook based pre-coder beamforming. The two multi-array antennas 1005, 1006 are positioned in a side by side arrangement such that the separation distance between adjacent high-band arrays 1012, 1013 is 180 mm or 1.6λ at 2660 MHz. One of two low-band dual-polarized antenna arrays (e.g., antenna array 1020) is connected to a LTE 3GPP Band 20 (800 MHz) base station radio unit 1041 with two RF ports for illustration only, via two of the corresponding ports 1030. The remaining unused ones of the ports 1030, e.g., two low-band antenna ports for antenna array 1021 may be used for another low-band service (not shown). It can be shown that combinations of the preferred array separation distances (0.5λ, 1.6λ, 2.7λ, 3.8λ) can also be used for higher order beamforming. By ensuring these optimal distances are used, minimum inter-sector interference will result.

Figure 11:
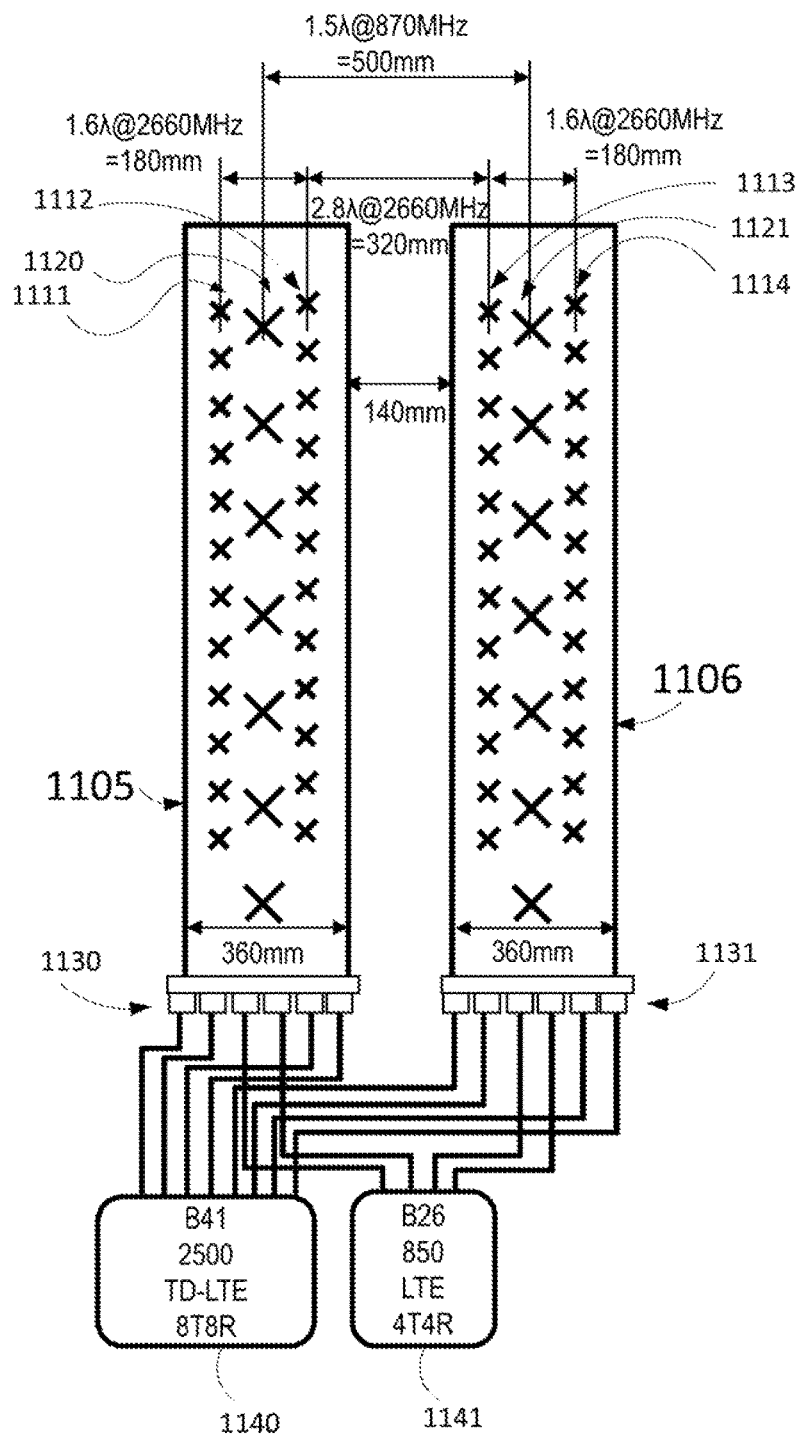
FIG. 11 illustrates an eighth example antenna system of the present disclosure.

FIG. 11 illustrates another example of the present disclosure which uses combinations of array separation distances for multi-band antenna solutions. As illustrated in FIG. 11, antenna system 1100 includes two multi-array antennas 1105, 1106 (which may the same as or similar to multi-array antennas 605, 606 of FIG. 6), each having one dual-polarized array 1120, 1121 serving a low-band range of spectrum and two dual-polarized arrays 1111, 1112 and 1113, 1114, respectively, serving a high-band range of spectrum. As further illustrated in FIG. 11, the high-band dual-polarized arrays 1111-1114 are connected to a TD-LTE 3GPP Band 41 (2500 MHz) base station radio unit 1140 with eight RF ports via a corresponding four of the ports 1130 and four of the ports 1131. In one example, base station radio unit 1140 is designed to operate with dual-layer beamforming Transmission Mode 8. The high-band arrays 1111, 1112 and 1113, 1114, in each of the multi-array antennas 1105, 1106 have a separation distance of 180 mm or 1.6λ at 2660 MHz. The two multi-array antennas 1105, 1106 are positioned in a side by side arrangement such that the separation distance between adjacent high-band arrays 1112, 1113 of the two multi-array antennas is 320 mm or 2.7λ at2660 MHz, which also corresponds to a separation distance between the two dual-polarized low-band arrays 1120, 1121 of around 500 mm or 1.5λ at 870 MHz. The low-band dual-polarized arrays 1120, 1121 are connected to a FDD LTE 3GPP Band 26 (850 MHz) base station radio unit 1141 with four RF ports via two of the ports 1130 and two of the ports 1131 (e.g., ports for low-band arrays 1120 and 1121, respectively). As in other examples, the base station radio unit 1141 is designed to operate with codebook based pre-coder beamforming. In the example of FIG. 11, the particular separation distances between dual-polarized arrays have been jointly optimized for both low-band and high-band for a minimal level of inter-sector interference.

Figure 12:
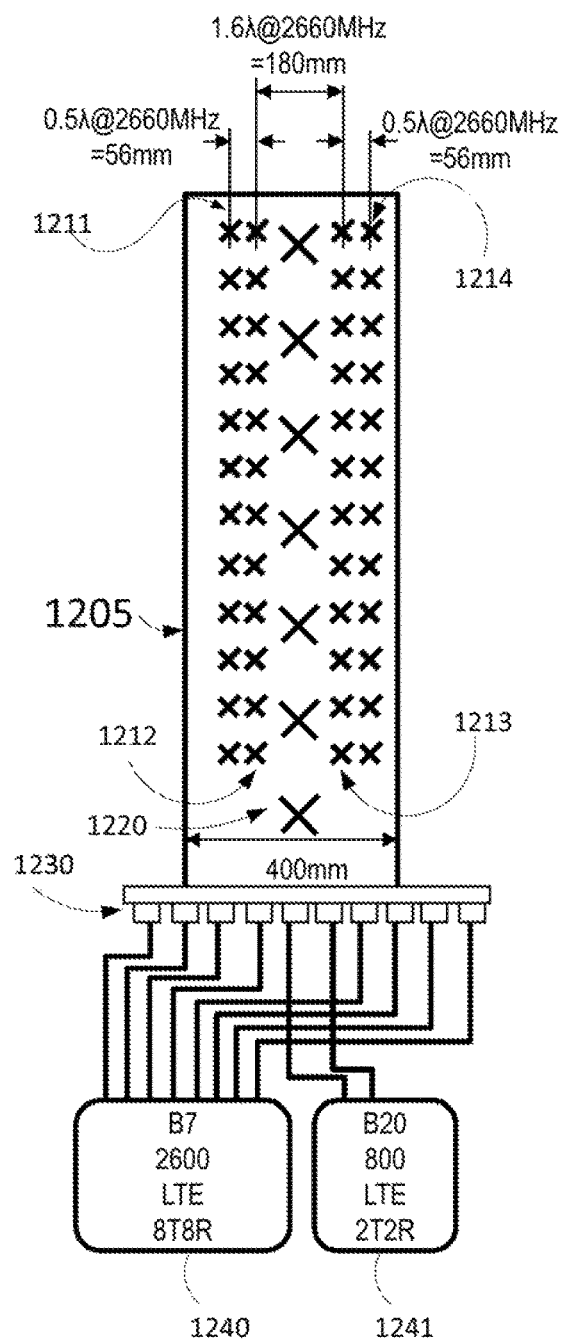
FIG. 12 illustrates a ninth example antenna system of the present disclosure.

FIG. 12 is a further example of the present disclosure which illustrates the use of combinations of array separation distances for multi-band antenna solutions. As illustrated in FIG. 12, antenna system 1200 includes a single multi-array antenna 1205 having one dual-polarized array 1220 serving a low-band range of spectrum and four dual-polarized arrays 1211-1214 serving a high-band range of spectrum. As further illustrated in the example of FIG. 12, the high-band dual-polarized arrays 1211-1214 are connected to a LTE 3GPP Band 7 (2600 MHz) base station radio unit 1240 with eight RF ports via a corresponding eight of the ports 1230. In one example, base station radio unit 1240 is designed to operate with codebook based pre-coder beamforming. The four high-band arrays 1211-1214 are arranged in two pairs (1211, 1212 and 1213, 1214), positioned either side of the low-band array 1220. The arrays within each pair of the high-band arrays 1211-1214 have a separation distance of 56 mm or 0.5λ at 2660 MHz. The pairs of high-band arrays 1211-1214 are arranged such that the adjacent arrays from each pair (e.g., 1212, 1213) are separated by a distance of 180 mm or 1.6λ at 2660 MHz. For illustrative purposes, the low-band dual-polarized antenna array 1220 is connected to a LTE 3GPP Band 20 (800 MHz) base station radio unit 1214 with two RF ports via a corresponding two of the ports 1230.

The preceding embodiments and descriptions have focused upon optimizing array separation distances which minimize inter-sector interference for the common three-sectored base station site with equal 120 degree wide sector apertures. Examples of the present disclosure also extend to optimal array separation distances for other base station sectorizations, such as four sectors, or six sectors. Examples of the present disclosure further include the case for unequal sector apertures which cover 360 degrees around a base station site in total, or of equal or unequal sector aperture of less than 120 degrees.

In addition, the preceding examples and descriptions have focused upon using dual-polarized arrays, which exploit polarization diversity of the radio channel, which is the most popular choice of radiating element for base station antenna systems. However, examples of the present disclosure also apply to single polarized arrays, or to two single polarized arrays which exploit space diversity instead of polarization diversity of the radio channel. Such space diversity solutions for macro base stations generally require large (>10λ) spatial separation between them.

The present disclosure exploits preferred array separation distances between two or more arrays when a 0.5λ separation is not physically possible. The examples illustrate that new multi-array antennas do not have to be designed to exploit these preferred distances. By using existing multi-array antennas with knowledge of how the arrays are positioned, it is possible to jointly optimize the positions of the multi-array antennas such that the preferred array separation distances (or close to) can be achieved, thus ensuring a minimal level of inter-sector interference across the base station sectors.

In particular, as described in the examples above, antenna systems of the present disclosure include beamforming arrays that are deployed substantially 1.6+1.1n wavelengths apart with respect to an operating frequency, where n is an integer greater than or equal to zero. The operating frequency may be that of a base station coupled to the arrays and/or with respect to an intended operating range for arrays. In this regard it should be noted that the terms "approximately," "substantially," or "near optimal," when applied to array separation distances, may comprise a range above and below an "optimal" array separation distance of 1.6+1.1n wavelengths. For instance, in one example, "substantially" may comprise +/−30 percent, in another example "substantially" may comprise +/−20 percent, in still another example, "substantially" may comprise +/−10 percent, and so forth. To illustrate, as can be seen from the graph of FIG. 3, one of the "optimal" array separation distances is around 1.6λ (label 315). However, interference relative to a non-beamformed fixed 65 degree azimuth beam (e.g., zero dB) is reduced even below 1.4λ or above 1.8λ. In addition, interference relative to a 2-column array operating in the same band with "worst case" array separation distances of 1.1λ, 2.2λ, 3.3λ, etc., is also reduced for array separation distances such as below 0.9λ, above 1.3λ, below 2λ, and above 2.4λ, for example. In addition, in multi-band antenna systems of the present disclosure, a first set of beamforming arrays may be deployed substantially 1.6+1.1n wavelengths apart with respect to a first operating frequency (or frequency band), while a second set of beamforming arrays may be deployed substantially 1.6+1.1 m wavelengths apart with respect to a second operating frequency (or frequency band), where n and m are integers greater than or equal to zero, and where the exact array separation distances that are implemented relative to 1.6+1.1 n and 1.6+1.1 m may be jointly optimized, e.g., based upon best overall performance for communications in both bands, based upon the configurations of commercially available multi-band arrays sharing a radome, based upon wind loading constraints, and so forth.

While the foregoing describes various examples in accordance with one or more aspects of the present disclosure, other and further example(s) in accordance with the one or more aspects of the present disclosure may be devised without departing from the scope thereof, which is determined by the claim(s) that follow and equivalents thereof.

What is claimed is:

1. A base station system comprising:
   at least three sectors, each sector of the at least three sectors providing a wireless communications service over a range of azimuth angles in a service area, each sector of the at least three sectors comprising at least one base station radio unit of a plurality of base station radio units, each of the plurality of base station radio units for operation in a particular band of radio spectrum and for applying precoding weights for beamforming signals via a respective antenna system of a plurality of antenna systems; and
   the plurality of antenna systems, each antenna system of the plurality of antenna systems comprising a plurality of linear antenna arrays, each linear antenna array of the plurality of linear antenna arrays comprising a plurality of radiating antenna elements arranged linearly in a vertical plane, the plurality of linear antenna arrays disposed adjacent to each other in a horizontal plane, wherein, in at least one antenna system of the plurality of antenna systems, at least one set of linear antenna arrays of the plurality of linear antenna arrays for an operating frequency associated with one of the plurality of base station radio units has an array separation distance of substantially 1.6 wavelengths apart at the operating frequency;
   wherein the array separation distance minimizes radio frequency power radiated by grating lobes at angles which fall into service areas of sectors adjacent to a sector of the at least three sectors associated with the at least one antenna system, the grating being caused by the precoding weights of the one of the plurality of base station radio units when serving traffic within the sector associated with the at least one antenna system.

2. The base station system of claim 1, wherein for the at least one antenna system, the plurality of linear antenna arrays are all contained within a same multi-array antenna assembly.

3. The base station system of claim 1, wherein for the at least one antenna system, at least one linear antenna array of the at least one set of linear antenna arrays is contained in a different antenna assembly from the other linear antenna arrays of the at least one set of linear antenna arrays.

4. The base station system of claim 1, wherein for the sector associated with the at least one antenna system there are at least two antenna systems of the plurality of antenna systems, each of the at least two antenna systems for operation in a different spectrum band, wherein for each of the at least two antenna systems the plurality of linear antenna arrays are all contained within a same antenna assembly.

5. The base station system of claim 1, wherein for the sector associated with the at least one antenna system there are at least two antenna systems of the plurality of antenna systems, each of the at least two antenna systems for operation in a different spectrum band, wherein for each of the at least two antenna systems the plurality of linear antenna arrays comprises at least one linear antenna array that is contained in a different antenna assembly from the other linear antenna arrays of the plurality of linear antenna arrays.

6. The base station system of claim 1, wherein for the sector associated with the at least one antenna system there are at least two antenna systems of the plurality of antenna systems, each of the at least two antenna systems for operation in a different spectrum band, wherein for a first of the at least two antenna systems the plurality of linear antenna arrays are all contained within a same antenna assembly, and wherein for a second of the at least two antenna systems at least one linear antenna array of the plurality of linear antenna arrays is contained in a different antenna assembly from the other linear antenna arrays of the plurality of linear antenna arrays.

7. The base station system of claim 1, wherein for the sector associated with the at least one antenna system there are at least two base station radio units and at least two antenna systems of the plurality of antenna systems, a first of the at least two antenna systems comprising the at least one antenna system with the at least one set of linear antenna arrays having the array separation distance of substantially 1.6 wavelengths apart at the operating frequency associated with the one of the plurality of base station radio units, the one of the plurality of base station radio units comprising a first of the at least two base station radio units, and a second of the at least two antenna systems having at least one pair of adjacent linear antenna arrays separated by a second array separation distance, wherein the second array separation distance is substantially 1.6+1.1n wavelengths apart at a second operating frequency associated with a second base station radio unit of the at least two base station radio units of the sector, where n is an integer greater than or equal to zero.

8. The base station system of claim 1, wherein the plurality of radiating antenna elements comprise dual-polarized radiating antenna elements.

9. The base station system of claim 1, wherein for the sector associated with the at least one antenna system there are at least two base station radio units and at least two antenna systems of the plurality of antenna systems, a first of the at least two antenna systems comprising the at least one antenna system with the at least one set of linear antenna arrays having the array separation distance of substantially 1.6 wavelengths apart at the operating frequency associated with the one of the plurality of base station radio units, the one of the plurality of base station radio units comprising a first of the at least two base station radio units, and a second of the at least two antenna systems having at least one pair of adjacent linear antenna arrays separated by a second array separation distance, wherein the second array separation distance is substantially a half wavelength apart at a second operating frequency associated with a second base station radio unit of the at least two base station radio units of the sector.

10. A method of operation of a base station system comprising:

generating a radio signal via a first base station radio unit of a plurality of base station radio units, the first base station radio unit associated with a first sector of at least three sectors of the base station system, each sector of the at least three sectors providing a wireless communications service over a range of azimuth angles in a service area, each sector of the at least three sectors comprising at least one base station radio unit of the plurality of base station radio units, each of the plurality of base station radio units for operation in a particular band of radio spectrum and for applying precoding weights for beamforming signals via a respective antenna system of a plurality of antenna systems; and transmitting the radio signal via a first antenna system that is coupled to the first base station radio unit and associated with the first sector, wherein the base station system comprises the plurality of antenna systems, the plurality of antenna systems including the first antenna system, each antenna system of the plurality of antenna systems comprising a plurality of linear antenna arrays, each linear antenna array of the plurality of linear antenna arrays comprising a plurality of radiating antenna elements arranged linearly in a vertical plane, the plurality of linear antenna arrays disposed adjacent to each other in a horizontal plane, wherein, in the first antenna system, at least one set of linear antenna arrays of the plurality of linear antenna arrays for an operating frequency associated with the first base station radio unit has an array separation distance of substantially 1.6 wavelengths apart at the operating frequency;

wherein the array separation distance minimizes radio frequency power radiated by grating lobes at angles which fall into service areas of sectors adjacent to the first sector, the grating being caused by the precoding weights applied by the first base station radio unit.

11. The method of claim 10, wherein for the first antenna system, the plurality of linear antenna arrays are all contained within a same multi-array antenna assembly.

12. The method of claim 10, wherein for the first antenna system, at least one linear antenna array of the at least one set of linear antenna arrays is contained in a different antenna assembly from the other linear antenna arrays of the at least one set of linear antenna arrays.

13. The method of claim 10, wherein for the first sector associated with the first antenna system there are at least two antenna systems of the plurality of antenna systems, the at least two antenna systems including the first antenna system, each of the at least two antenna systems for operation in a different spectrum band, wherein for each of the at least two antenna systems the plurality of linear antenna arrays are all contained within a same antenna assembly.

14. The method of claim 10, wherein for the first sector associated with the first antenna system there are at least two antenna systems of the plurality of antenna systems, each of the at least two antenna systems for operation in a different spectrum band, wherein for each of the at least two antenna systems the plurality of linear antenna arrays comprise at least one linear antenna array that is contained in a different antenna assembly from the other linear antenna arrays of the plurality of linear antenna arrays.

15. The method of claim 10, wherein for the first sector associated with the first antenna system there are at least two antenna systems of the plurality of antenna systems, each of the at least two antenna systems for operation in a different spectrum band, wherein for the first antenna system, the plurality of linear antenna arrays are all contained within a same antenna assembly, and wherein for a second of the at least two antenna systems at least one linear antenna array of the plurality of linear antenna arrays is contained in a different antenna assembly from the other linear antenna arrays of the plurality of linear antenna arrays.

16. The method of claim 10, wherein for the first sector associated with the first antenna system there are at least two base station radio units and at least two antenna systems of the plurality of antenna systems, the at least two base station radio units including the first base station radio unit, the at least two antenna systems including the first antenna system and a second antenna system having at least one pair of adjacent linear antenna arrays separated by a second array separation distance, wherein the second array separation distance is substantially 1.6+1.1n wavelengths apart at a second operating frequency associated with a second base station radio unit of the at least two base station radio units of the first sector, where n is an integer greater than or equal to zero.

17. The method of claim 10, wherein the plurality of radiating antenna elements comprise dual-polarized radiating antenna elements.

18. The method of claim 10, wherein for the first sector associated with the first antenna system there are at least two base station radio units and at least two antenna systems of the plurality of antenna systems, the at least two base station radio units including the first base station radio unit, the at least two antenna systems including the first antenna system and a second antenna system having at least one pair of adjacent linear antenna arrays separated by a second array separation distance, wherein the second array separation distance is substantially a half wavelength apart at a second operating frequency associated with a second base station radio unit of the at least two base station radio units of the first sector.

* * * * *